United States Patent
Thomas et al.

(10) Patent No.: US 6,923,297 B1
(45) Date of Patent: Aug. 2, 2005

(54) DISC BRAKE SEAL ASSEMBLY

(75) Inventors: Paul Thomas, Gwent (GB); Paul Roberts, South Wales (GB); Don Hobday, South Glamorgan (GB)

(73) Assignee: Meritor Heavy Vehicle Braking Systems (UK) Ltd., (GB)

( * ) Notice: Subject to any disclaimer, the term of this patent is extended or adjusted under 35 U.S.C. 154(b) by 599 days.

(21) Appl. No.: 09/647,126

(22) PCT Filed: Mar. 18, 1999

(86) PCT No.: PCT/GB99/00839

§ 371 (c)(1),
(2), (4) Date: Nov. 20, 2000

(87) PCT Pub. No.: WO99/49242

PCT Pub. Date: Sep. 30, 1999

(30) Foreign Application Priority Data

Mar. 26, 1998 (GB) ................................ 9806543

(51) Int. Cl.$^7$ ............................................... F16D 55/08
(52) U.S. Cl. .................. 188/72.8; 188/196 D; 277/351
(58) Field of Search .............................. 277/551, 562, 277/571, 572; 403/50, 51; 188/176 D, 71.9, 188/72.7, 72.8

(56) References Cited

U.S. PATENT DOCUMENTS

| | | | |
|---|---|---|---|
| 3,490,343 A | | 1/1970 | Afanador et al. |
| 4,222,310 A | * | 9/1980 | Garrett et al. .............. 403/361 |
| 4,502,572 A | | 3/1985 | Davidson et al. |
| 4,506,768 A | | 3/1985 | Innocent |
| 4,688,661 A | * | 8/1987 | Gockel et al. .......... 188/196 D |
| 5,520,267 A | * | 5/1996 | Giering et al. ............. 188/72.7 |
| 5,568,845 A | * | 10/1996 | Baumgartner et al. .. 188/196 D |
| 5,853,177 A | * | 12/1998 | Brissette et al. ............ 277/551 |
| 6,227,548 B1 | * | 5/2001 | Netzer ........................ 277/572 |
| 6,269,914 B1 | * | 8/2001 | Angerfors ............... 188/196 D |
| 6,325,182 B1 | * | 12/2001 | Yamaguchi et al. ........ 188/162 |

FOREIGN PATENT DOCUMENTS

| | | |
|---|---|---|
| DE | 4334914 | 4/1995 |
| FR | 2593570 | 7/1987 |
| JP | 1558148 | 7/1977 |

* cited by examiner

Primary Examiner—Robert A. Siconolfi
(74) Attorney, Agent, or Firm—Carlson, Gaskey & Olds

(57) ABSTRACT

A seal device for use in sealing between parts of a thrust assembly of a disc brake has a support element (31) adapted to be carried by a first part (25) of the thrust assembly, the support element (31) carrying a seal (33) arranged so that, with the support element (31) in its position of use on the first part (25), the seal (33) engages a surface of a second part (25) of the thrust assembly in sealing relationship. Also disclosed is a thrust assembly for a disc brake and a disc brake incorporating such an assembly.

8 Claims, 3 Drawing Sheets

FIG 2 'A-A'

DISC BRAKE SEAL ASSEMBLY

BACKGROUND OF THE INVENTION

This invention relates to a seal device for use in sealing between parts of a thrust assembly of a disc brake, primarily for a motor vehicle, and to a disc brake incorporating the seal device and thrust assembly.

One conventional type of thrust assembly, in the form of an adjustable tappet assembly, has a pair of threadedly interengaged parts forming a strut of which the length can be varied by relative rotation between the parts to perform a brake adjustment, in use. In order to provide the necessary sealing between the relatively rotatable strut parts and between the strut parts and adjacent surfaces, it has been necessary to provide multiple seals, together with inserts for the retention and/or support of the seals, as well as to effect machining of the parts to provide adequate sealing surfaces for engagement by the various seals. Such arrangements are complicated to manufacture and assemble, giving rise to relatively high costs.

An object of the invention is to provide a simpler and more cost-effective seal device for use in a thrust assembly of a disc brake, as compared with the aforesaid conventional arrangements.

SUMMARY OF THE INVENTION

According to a first aspect of the invention, a seal device for use in sealing between parts of a thrust assembly of a disc brake comprises a support element adapted to be carried externally by a first part of the thrust assembly, the support element carrying a seal arranged so that, with the support element in its position of use on the first part, the seal engages a surface of a second part of the thrust assembly in sealing relationship.

In one convenient arrangement, an outer surface of the support element serves, in use, for engagement by a further seal carried by adjacent structure.

Preferably, the support element is in the form of a cap having a generally annular skirt adapted to fit, in use, over an end portion of the first element, the outer surface of the skirt serving for engagement by said further seal.

According to another aspect of the invention, a seal device for use in sealing between parts of a thrust assembly of a disc brake comprises a support element adapted to be carried by a first part of the thrust assembly, the support element carrying a seal arranged so that, with the support element in its position of use on the first part, the seal engages a surface of a second part of the thrust assembly in sealing relationship, the support element being arranged so that an outer surface thereof serves, in use, for engagement by a further seal carried by adjacent structure.

Preferably, the support element is carried externally by said first part of the thrust assembly and is conveniently in the form of a cap having a generally annular skirt adapted to fit, in use, over an end portion of the first element, the outer surface of the skirt serving for engagement by said further seal.

According to a further aspect of the invention, a thrust assembly comprises a pair of relatively movable parts, and a seal device which has a support element carried externally by a first of said parts, the support element carrying a seal arranged to engage a surface of a second of said parts in sealing relationship.

Conveniently, an outer surface of the support element provides a sealing surface engaged by a further seal carried by adjacent structure.

The support element is preferably in the form of a cap having a generally annular skirt fitted over an end portion of the first element, the outer surface of the skirt providing the sealing surface engaged by the further seal.

According to a yet further aspect of the invention a thrust assembly comprises a pair of relatively movable parts, and a seal device which has a support element carried by a first of said parts, the support element carrying a seal arranged to engage a surface of a second of said parts in sealing relationship, the support element being arranged so that an outer surface thereof serves, in use, for engagement by a further seal carried by adjacent structure.

Preferably the support element is carried externally by said first part and is conveniently in the form of a cap having a generally annular skirt fitted over an end portion of the first element, the outer surface of the skirt providing the sealing surface engaged by the further seal.

The invention will now be described, by way of example, with reference to the accompanying drawings in which:

DETAILED DESCRIPTION OF THE PREFERRED EMBODIMENT

Figure 1:
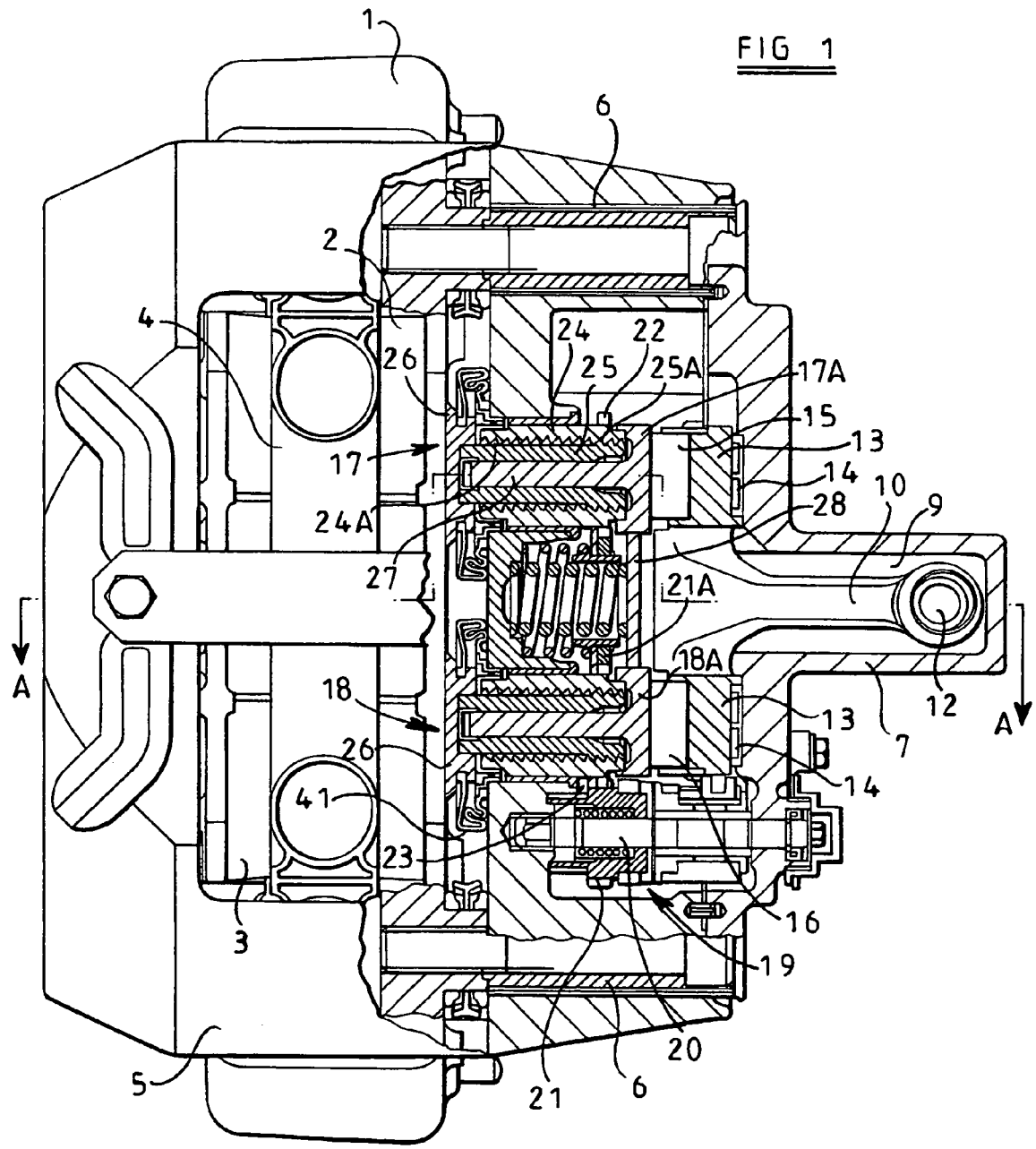
FIG. 1 is a plan view, partly in cross-section, of one form of the brake of the invention.
Figure 2:
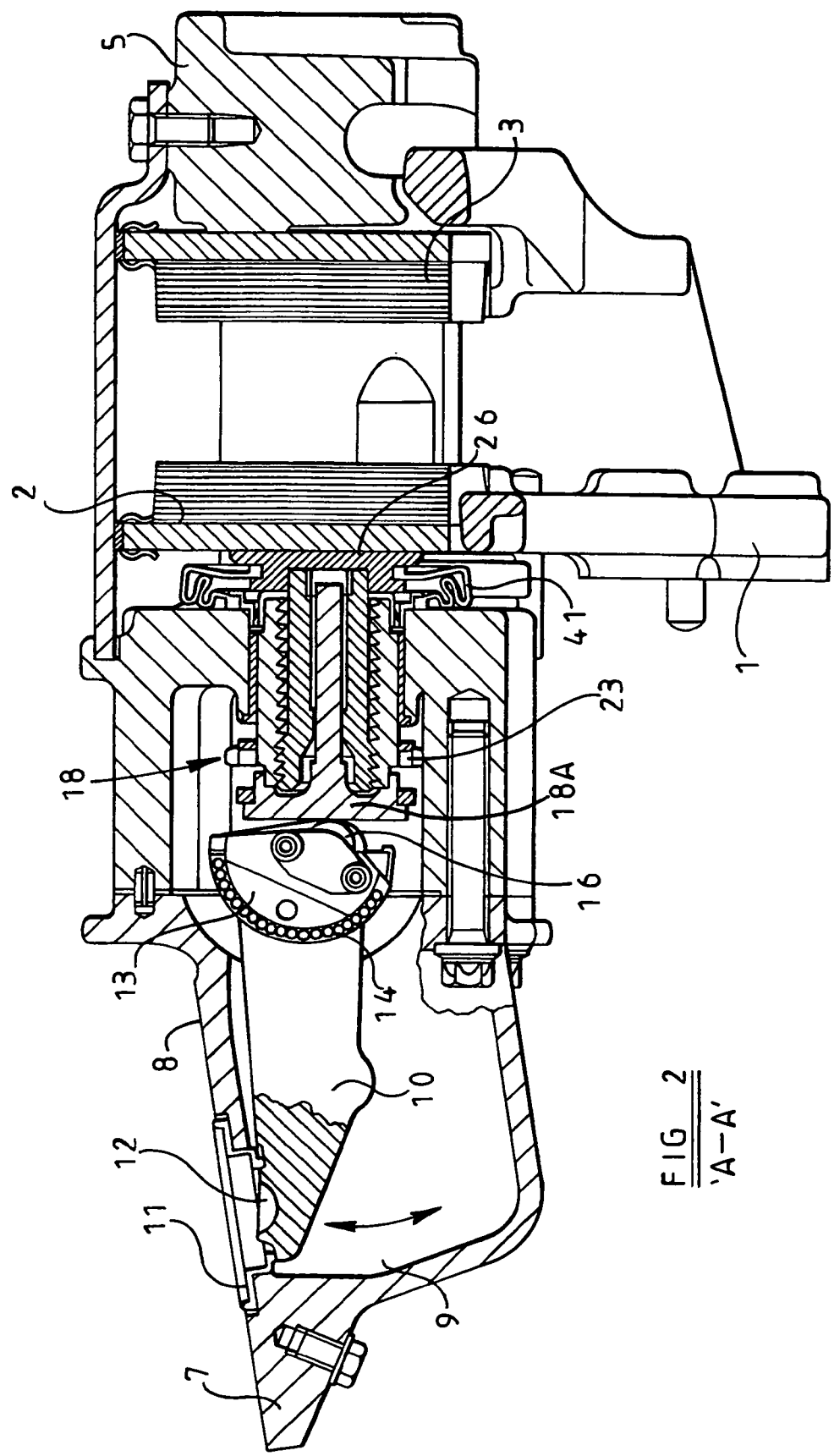
FIG. 2 is a cross-section alone line A—A of FIG. 1.

Referring to FIGS. 1 and 2 of the drawings, the illustrated disc brake has a fixed carrier 1 which carries a pair of friction elements 2 and 3, such as friction pads, disposed respectively at either side of a brake disc 4. The carrier 1 serves to mount the brake on a vehicle and to absorb torque sustained by the pads during a braking operation. A clamp member or caliper 5 straddles the brake disc and is mounted on the carrier 1 so as to be slidable axially of the brake disc relative to the carrier 1, by way of pins 6, in conventional manner. The caliper 5 carries an integral housing 7 which is adapted to mount a conventional air or other power actuator (not shown) on an external face 8 thereof. The housing 7 defines a chamber 9 within which a pivotal brake actuating lever 10 may conveniently perform an angular reciprocal swinging movement, as indicated by the arrows (FIG. 2), under the action of a thrust member of the power actuator which, with the latter mounted on the external face 8, extends through an opening 11 of the housing 7 into engagement with a recess 12 of the brake actuating lever 10. The brake actuating lever 10 is integral with or attached to a rotary actuating member 13 which is rotatably supported within the caliper by way of a pair of needle bearing assemblies 14. The rotary actuating member 13 is recessed to house respective cylindrical rollers 15 and 16, the axes of which are offset from the rotary axis of the rotary actuating member 13 to form an eccentric actuating arrangement with the cylindrical rollers 15 and 16 bearing against respective thrust members 17A and 18A of adjacent adjustable tappet assemblies 17 and 18. Rotation of the brake actuating lever 10 and its connected rotary actuating member 13 causes actuating thrust to be applied via the tappet assemblies to the directly actuated friction element 2, and by a reaction via the caliper 5, to the indirectly actuated friction element 3.

The thrust assemblies, illustrated as adjustable tappet assemblies 17 and 18, are disposed at either side of a center line of the brake passing through the brake actuating lever 10 and are associated with an adjuster assembly 19 which lies laterally offset from and adjacent the adjustable tappet assembly 18. The adjuster assembly may be of any appropriate conventional type needing no detailed description for the purpose of the present invention. The adjuster responds to excessive movement of the friction elements 2 and 3 and produces resultant rotation of an adjuster shaft 20 which, via an output gear 21 and an intermediate idler gear 21A, rotates a pair of input gears 22 and 23 associated respectively with the adjustable tappet assemblies 17 and 18.

Figure 3:
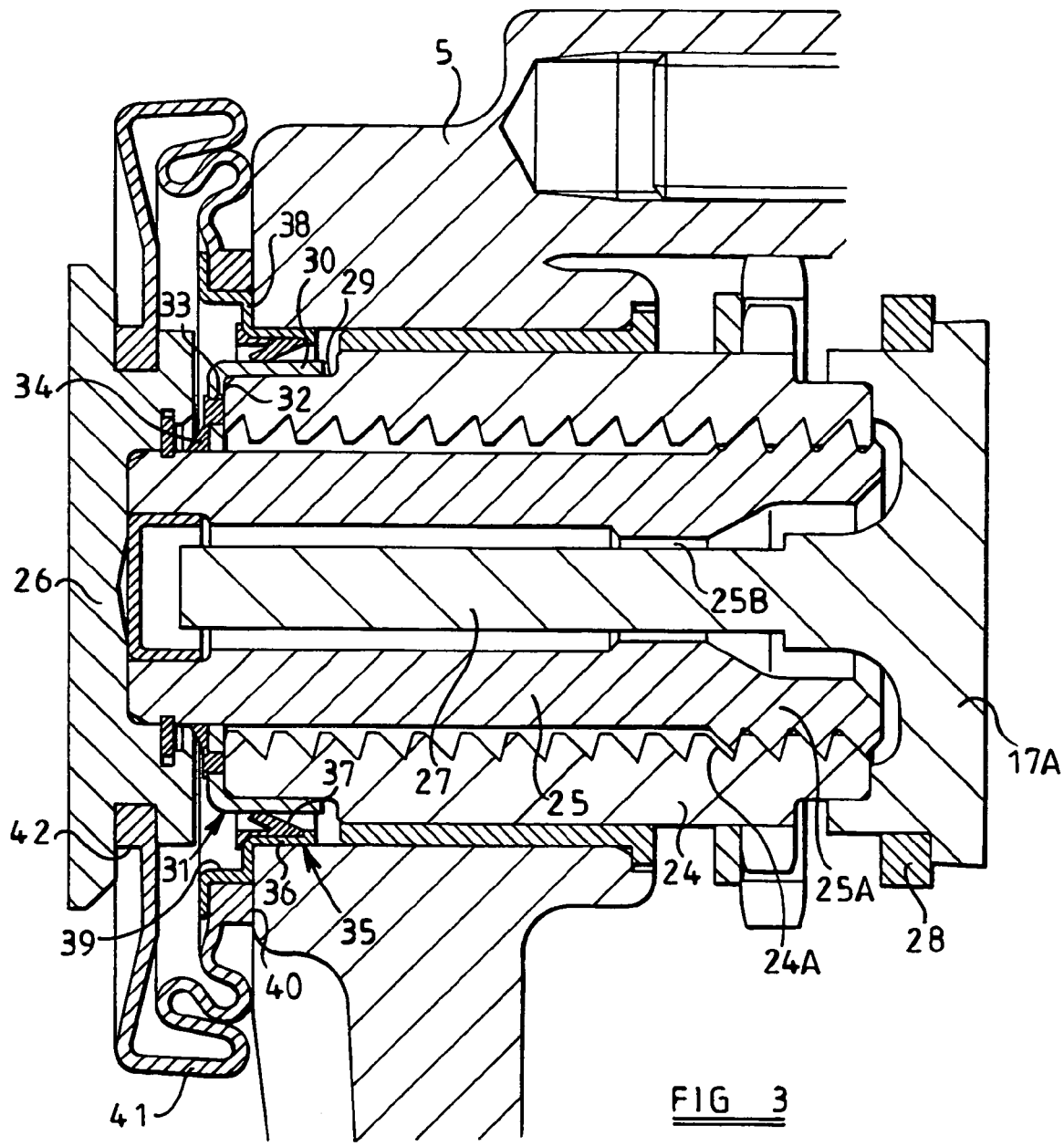
FIG. 3 is an enlarged cross-sectional view of a thrust member forming part of the brake of FIGS. 1 and 2.

The adjustable tappet assemblies 17 and 18 are of identical construction and operation, and only the adjustable tappet assembly 17 will be described, with reference to FIGS. 1 and 3, in sufficient detail for a full understanding of the present invention. This assembly has an outer sleeve 24 which includes internal threads 24A and receives a hollow internal shaft 25 having an externally threaded portion 25A extending over a part of its length for cooperation with the internal thread of the outer sleeve 24. The hollow internal shaft 25 and the outer sleeve 24 form between them an adjuster strut of variable length. The hollow internal shaft 25 is provided, at its outer end, with a tappet head 26, which bears against the adjacent friction element 2 and which is releasably coupled to the shaft so as, conveniently, to be freely rotatable relative to the latter. To enable the hollow internal shaft 25 to be moved axially by rotation of the outer sleeve 24 so as to extend the adjuster strut in compensation for wear of the friction elements, it is necessary to lock this shaft against rotary movement. This is achieved, in the present embodiment, by providing the thrust member 17A, which is engaged over the adjacent end of the outer sleeve 24, with an elongate stem 27 of non circular cross-section which extends within the hollow internal shaft 25, of which at least a part 25B of the internal surface forms a complementary bore. The thrust members 17A and 18A of the respective tappet assemblies are each provided with, for example, a generally planar external surface for locking engagement with a corresponding adjacent surface on a fixed plate 28.

The present invention is concerned particularly with improving the sealing arrangement between the outer sleeve 24 and inner shaft 25. To this end, as can be seen in FIG. 3, an end portion of the sleeve 24 adjacent the tappet head 26 is relieved to provide a reduced diameter portion 29, which carries a support element 31 of a seal device, the element 31 being in the general form of a cap. An annular skirt or flange 30 of the support element is received over the portion 29, conveniently by press-fitting. The inner shaft 25 extends through a flat annular base 32 of the support element which rests against the adjacent end of the sleeve 24 and carries a seal, of which an annular rim 33 is housed within the portion 32. An annular lip 34 of the seal engages the outer surface of the shaft 25 in sealing relationship. The support element 31 may conveniently be manufactured from stainless steel. A metal retainer 35 has a first annular portion 36, which is a press fit in the caliper 5, and to which is attached a further lip seal 37 engaging the outer surface of the annular skirt 30 of the support element 31, such outer surface providing a smooth sealing surface for cooperation with the lip seal 37. The retainer 35 has a further annular portion 38 lying against an adjacent surface of the caliper 5, the remainder of the retainer forming an annular channel 39 to receive a bead 40 of a main convoluted boot seal 41, a further bead 42 of which is received within a groove of the tappet head 26.

The above-described sealing device 31 is particularly advantageous in terms of its simplicity and effectiveness in providing a high integrity seal between the sleeve 24 and shaft 25 and also in providing a smooth sealing surface on its cylindrical part 30, for engagement by the further seal 37, thereby largely obviating the necessity for high quality expensive machining and/or plating of the outer surface of the sleeve 24 for sealing purposes.

It will be understood that the annular lip 34 and the further lip seal 37 may be of any convenient form and retained in any convenient manner on their respective support element 31 and metal retainer 35 which, in turn, may have any convenient shape whilst retaining their essential purpose according to the invention.

The flat annular base 32 may conveniently provide stop means for limiting the axial movement of the tappet assembly at extremes of adjustment.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An adjustable tappet assembly for a disc brake comprising an internally threaded outer sleeve, an externally threaded internal shaft, and a seal device, said seal device having a support element carried by said sleeve, said support element carrying a seal for sealing between said sleeve and said shaft having a lip portion arranged to engage an unthreaded surface portion of said shaft in sealing relationship for providing sealing during axial movement of said shaft relative to said sleeve.

2. The assembly as recited in claim 1 wherein an outer surface of said support element provides a smooth sealing surface engaged, in use, by a lip portion of a further seal carried by an adjacent structure.

3. The assembly as recited in claim 2 wherein said support element is in the form of a cap having a generally annular skirt fitted over an end portion of said sleeve, said outer surface of said skirt providing said sealing surface engaged by said further seal.

4. The assembly as recited in claim 1 wherein said support element is carried externally by said sleeve.

5. The assembly as recited in claim 1 wherein an annular base of said support element rests, in use, against an adjacent end of said sleeve with a portion of said shaft extending through said base.

6. The assembly as recited in claim 5 wherein said annular base houses an annular rim of said seal for sealing between said sleeve and said shaft.

7. The assembly as recited in claim 5 wherein said lip portion of said seal for sealing between said sleeve and said shaft extends axially away from said base and said sleeve.

8. The assembly as recited in claim 1 wherein said assembly is incorporated into a disc brake.

* * * * *